United States Patent
Ward

(10) Patent No.: US 10,329,207 B2
(45) Date of Patent: Jun. 25, 2019

(54) PROBIOTIC INFUSED LIGNOCELLULOSIC SOIL AMENDMENT AND GROWTH MEDIUM

(71) Applicant: Paula Marie L. Ward, Ringoes, NJ (US)

(72) Inventor: Paula Marie L. Ward, Ringoes, NJ (US)

( * ) Notice: Subject to any disclaimer, the term of this patent is extended or adjusted under 35 U.S.C. 154(b) by 49 days.

(21) Appl. No.: 15/106,078

(22) PCT Filed: Dec. 19, 2014

(86) PCT No.: PCT/US2014/071534
§ 371 (c)(1),
(2) Date: Jun. 17, 2016

(87) PCT Pub. No.: WO2015/095722
PCT Pub. Date: Jun. 25, 2015

(65) Prior Publication Data
US 2016/0318821 A1    Nov. 3, 2016

Related U.S. Application Data

(60) Provisional application No. 61/918,074, filed on Dec. 19, 2013, provisional application No. 62/055,304, filed on Sep. 25, 2014.

(51) Int. Cl.
*C05F 11/00* (2006.01)
*C05F 11/08* (2006.01)

(52) U.S. Cl.
CPC ............. *C05F 11/08* (2013.01); *C05F 11/00* (2013.01)

(58) Field of Classification Search
CPC ................................ C05F 11/08; C05F 11/00
See application file for complete search history.

(56) References Cited

U.S. PATENT DOCUMENTS

| | | |
|---|---|---|
| 5,476,788 A | 12/1995 | Lamar et al. |
| 5,597,730 A | 1/1997 | Aust et al. |
| 6,828,132 B2 | 12/2004 | Cheung |
| 2012/0090365 A1 | 4/2012 | Ersek et al. |

FOREIGN PATENT DOCUMENTS

| | | | | |
|---|---|---|---|---|
| CN | 103073337 A | * | 5/2013 | |
| WO | WO-2007111479 A1 | * | 10/2007 | ............. B09C 1/105 |

* cited by examiner

*Primary Examiner* — Jennifer A Smith
(74) *Attorney, Agent, or Firm* — Fox Rothschild LLP

(57) ABSTRACT

Compositions for treating soil combining lignocellulose-containing organic matter and spawn of a lignin-digesting fungal species. Methods of using the compositions for treating soil are also disclosed.

11 Claims, No Drawings

PROBIOTIC INFUSED LIGNOCELLULOSIC SOIL AMENDMENT AND GROWTH MEDIUM

CROSS-REFERENCE TO RELATED APPLICATIONS

The present application is the U.S. National Phase of International Application No. PCT/US2014/071534, filed Dec. 19, 2014, which claims priority benefit under 35 U.S.C § 119(e) to U.S. Provisional Patent Application Ser. Nos. 61/918,074 filed Dec. 19, 2013 and 62/055,304 filed Sep. 25, 2014. The disclosures of these applications are incorporated herein by reference.

FIELD OF THE INVENTION

The patent document relates to the field of microbial fertilizers, especially to compositions comprising a lignocellulose-containing organic matter and the spawn of lignin-digesting fungal species, and methods for treating soil.

BACKGROUND OF THE INVENTION

Modern fertilizers and crop protection products applied to cultivated fields and beds used for food and forage production often are responsible for surface waterway pollution caused by the runoff of excess nutrient application not taken up by the crops. These chemicals, applied at great expense to the producer, often help to produce good crop yields in the short term, and do little to improve the soil structure and function over the long term. Because of the reduction of healthy soil management, this approach is a worldwide threat to food security in particular, and to the environment in general. With an ever-growing world population, continued current unsustainable soil management practices could make the 1930s U.S. dustbowl a minor event in agricultural and food production history.

There are several factors contributing to the inefficient use of agricultural chemicals. The geology of some farming sites such as concentrated clay or sand deposits is marginally beneficial in its natural state for the production of many cash row and specialty crops. Many different soil types can coexist on a contiguous plot of land, requiring specific site conditioning to equalize the soil growing condition for consistent crop planning.

The current practice of no-till farming employs a surface application of nutrients (whether dry or wet), relying on atmospheric moisture in the forms of rain and dew to drive the distribution of the nutrients below the packed surface where plant roots can make the most value of the product. Cases of long standing dry conditions make surfaces hydrophobic, causing the repulsion of rain and dew from percolation down into the soil. In addition, the repeated use of pesticides and chemical fertilizers on farmland has changed the characteristics of soil by reducing the biodiversity of beneficial macro- and microorganisms that maintain the healthy organic exchange required for good soil friability, proper drainage and water-holding characteristics, and strong natural crop yields.

Over the last seventy-five years, nitrogenous compounds such as ammonium nitrate, ammonium sulfate, urea formaldehyde, and others provided slow release nutrients to crop fields, as soil microorganisms degraded the compound bonds and made the nutrients available. These concentrates were intended to feed the growing crop for the duration of the growing season, rarely longer.

Farmers looking for ways to reverse this damage are moving back to the practices of organic enrichment of fields. Some farmers rotate crops, or under plant the main crop to encourage both soil diversity and natural nutrient supplementation from one crop year to the next. Where farms are not diversified with both field crop and animal production activity providing de novo organic inputs like animal manures, chaff from field crops, and abattoir residuals, slow degrading nutrient supplementation (preferably pre-composted, or at least compostable organic materials) otherwise must be acquired. Uses for spent coffee grounds have been disclosed in various patents and scientific literature as a substrate for co-composting with other organics to produce humus for land application (U.S. Pat. No. 6,488,732).

A need remains for a biological fertilizer that not only brings readily available nutrition for plant uptake and reduces the application of pesticides and chemicals, but also encourages the favorable re-characterization of soil condition overall as a soil mediator.

SUMMARY OF THE INVENTION

Various embodiments provide compositions with a multifold of advantages for treating soil. Potential advantages include enriched nutrition for plant uptake from low cost recycled material, enhanced soil drainage properties, accelerated composting properties, increased plant production, decreased chemical and biological pollution and pest burden, and restoration of active biological soil diversity.

In one embodiment there is provided a composition for treating soil, comprising lignocellulose-containing organic matter and lignin-digesting fungal spawn. The composition is capable of degrading a lignin-rich material in situ to provide enhanced nutrition availability for plant uptake. In addition, the composition serves as a soil mediator by reducing harmful chemicals and nematodes and adjusting properties of the soil physically, chemically, and functionally. Because lignocellulose-containing organic matter can be obtained from recycled material such as spent coffee grounds (SPG), the production of the composition is inexpensive and environmentally friendly.

In certain embodiments, the spawn comprises a lignin peroxidase-producing fungal species.

In certain embodiments, the spawn comprises a white rot fungal species.

In another embodiment, a composition for treating soil is provided comprising lignocellulose-containing organic matter and a recombinant peroxidase-producing species. According to one aspect of this embodiment, the recombinant peroxidase-producing species produces lignin peroxidase. In another aspect of this embodiment, the species is a micro-organism.

In yet another embodiment, a composition for treating soil is provided comprising lignocellulose-containing organic matter and a lignin-digesting peroxidase, such as lignin peroxidase.

In one embodiment, the compositions are a ready to use microbial fertilizer composition for direct application to the soil. In another embodiment, the compositions comprise fungal spawn or other lignin peroxidase-producing species and a lignocellulose-containing carrier for subsequent mixing with lignins and other organic or non-organic fertilizer components by a fertilizer manufacturer or end-user. The latter embodiment is essentially a concentrated masterbatch of fungal spawn or other lignin-peroxidase-producing species formulated for addition to a fertilizer composition.

The two types of compositions vary by the weight ratio of spawn or other species to lignocellulose-containing material. In one embodiment, fertilizer compositions according to the present invention contain up to about 25 wt % fungal spawn. Spawn-containing fertilizer compositions according to the present invention are desiccated to provide a product having a water content of less than about 5 wt %, in which the spawn are in a non-vegetative state. In one embodiment, a fertilizer composition is provided comprising 1-2 wt % fungal spawn to 98-99 wt % substrate containing lignocellulosic organic materials and nutrient additives, all of which are mixed together by fertilizer blender. A masterbatch embodiment, i.e., spawn or other species sold in concentrate for later formulation by fertilizer manufacturers, is a product comprised of fully integrated spawn grown on a favorable lignocellulosic substrate and desiccated to provide a product that is almost entirely spawn in a non-vegetative state with a water content of less than about 5 wt %.

In certain embodiments, the inventive compositions also include a second species of a fungus or a bacteria species that produces a soil nutrient. The combination and diversity of various fungal species facilitates richness and long term success for the composition.

In certain embodiments, the lignocellulose-containing organic materials include spent coffee grounds.

In certain embodiments, the composition is in a form of a powder, granules, a suspension, dispersion, fibrous matter, a mixture, and combinations thereof.

In at least one embodiment there is provided a method of treating soil by applying effective amounts of the present composition to the soil.

DETAILED DESCRIPTION

Various embodiments combine low value lignocellulose-containing organic matter with select microorganism inocula that accelerate innate organic substrate nutrient availability. The resulting enhanced organic matter aerates the soil and inoculates the immediate area with beneficial microorganisms that consume the lignocellulose-containing organic matter and nutrients for growth and reproduction, thereby providing immediate nutrient requirements to the soil, while improving friability, drainage, and moisture management to clay, compacted, or sandy soil conditions.

Throughout this patent document, various publications are referenced. The disclosures of these publications in their entireties are hereby incorporated by reference into this application in order to more fully describe the state of the art to which the disclosed matter pertains. While the following text may reference or exemplify specific microorganisms and lignocellulose-containing materials, it is not intended to limit the scope of the invention to such particular reference or examples. For example, other lignin-digesting peroxidase producing species may be substituted for fungal spawn, including lignin peroxidase producing microorganisms. The microorganisms and fungal spawn may be replaced in whole or in part by lignin peroxidase. The resulting products will achieve the same objective by digesting lignocellulose-containing organic matter to produce soil nutrients.

Various modifications may be made by those skilled in the art, in view of practical and economic considerations, such as the source of the microorganisms and the characteristics of the lignocellulose-containing organic material. In order to more clearly and concisely describe the subject matter of the claims, the following definitions are intended to provide guidance as to the meaning of terms used herein.

Definitions

The articles "a" and "an" as used herein mean "one or more" or "at least one," unless otherwise indicated. That is, reference to any element of the present invention by the indefinite article "a" or "an" does not exclude the possibility that more than one of the element is present.

"About" means the referenced numeric indication plus or minus 10% of that referenced numeric indication.

"Degradation" or "degrade" as used herein refers to the breakdown of lignocellulose-containing material with the aid of microorganisms such as a white rot fungal and other microorganism species.

"Probiotic additive" as used herein refers to a single species of fungal spawn or a combination of species. The probiotic additive includes a white fungal species as an essential component. "Phenols" as used herein refer to phenols or its derivatives such as phenolic acids produced during the fungal degradation of lignocellulose-containing material.

"Spent coffee ground (SCG)" as used here in refers to the processed residue that remains from any of the beans of the genus *Coffea*, especially *C. arabica* and *C. canephora*, which are harvested and/or roasted for consumption.

"Treating soil" as used herein refers to one or more acts of changing the characteristics of the soil. Non-limiting examples include enhancing or enriching the nutrition content of the soil, changing or improving water holding or moisture retention capacity of the soil, providing weed preventive mulch barriers, reconditioning the soil (e.g. changing pH of the soil), reducing harmful nematode populations, providing a compost accelerator, serving as a over-wintering media for frost tender species, and bio-degrading hazardous substances in the soil (e.g. pesticides and other non-beneficial chemicals). "Mediating soil condition" as used herein refers to optimizing soil condition such that it is suitable for plant or crop growth. Non-limiting examples of mediating soil condition includes, for example, improving moisture retention capacity of soil, degrading harmful chemicals, adjusting pH, and serving as a secondary nutrition source.

"Water retention capacity" or "water holding capacity" as used herein refers to the ability of the soil in maintaining certain levels of water content. A hydrophilic soil exhibits a higher water retention capacity than a hydrophobic soil.

Composition for Treating Soil

In one embodiment there is provided a composition for treating soil. The composition includes lignocellulose-containing organic matter and the spawn of lignin-digesting fungal species. The composition is capable of providing enhanced nutrition availability for plant uptake from the lignocellulosic material and serving as a soil mediator or conditioner.

In certain embodiments, the lignin-digesting fungal species of the present composition is a member of a peroxidase-producing fungi family. Non-limiting examples of such peroxidase-producing fungi include white rot fungi (*Phanerochaete chrysosporium*), *Coprinus cinerus* (*macrorhizus*), *Arthromyces ramosus*, and *Caldariomyces fumago*. In other embodiments, compositions are provided in which other lignin-digesting species are substituted for the fungal species, including recombinant species transformed to express lignin-digesting peroxidases such as lignin peroxidase. Compositions are also provided in which lignin-digesting peroxidases are substituted for lignin digesting fungal spawn and other species.

In certain embodiments, the composition includes the spawn of a naturally occurring white rot fungal species. Besides digesting lignocellulosic materials, other functions of white rot fungi have also been reported. For example, white rot fungi are reported to reduce hydrophobicity in the soils proximate to colonies on decomposing substrates (White, et al, FEMS Microbiology Letters 184 (2000) 73-77). Hydrophobicity has been reported as a deleterious condition inherent in uncomposted coffee grounds, rendering them unsuitable as weed barrier mulch, or thickly applied top dressing for soils.

In addition to providing a weed growth prevention barrier, mulches also serve to maintain beneficial soil moisture, which would not occur when coffee grounds repel atmospheric moisture contribution to the system. White rot fungal activity in lignocellulosic materials such as spent coffee grounds bring water holding capacity to the system by breaking down the lignin into hydrophilic sugars, therefore attracting water to the system rather than repelling it. In addition, White rot fungal species have been reported to have bioremediation properties when exposed to chemical residue contaminants found in soils. Further, some white rot fungi are reported to scavenge for nematodes, diversifying its food source beyond ligneous material. Accordingly in certain embodiments, white rot fungus is an essential component of the composition.

In certain embodiments, the present composition includes the spawn of a second species of fungus or spores of a yeast, mold, or bacteria species that produces a soil nutrient. The diversity of the fungal probiotic additive in the composition brings the richness and promotes best long term success. Some fungi serve to decompose the lignin in the enrichment material, while some other fungal organisms specialize in specific functions. For example, phenols are known harmful side products for plant growth from degradation-rich materials. However, some co-existing fungal species in the present composition by cleaving the phenols into favorable nutrients may disable the evolving undesirable side products. In addition, the fruiting bodies of some fungal species could constitute a secondary protein crop. Non-limiting examples of such species include: *Coriolus versicolor, Phanerochaete chrysosporium, Daedalea quercina, Pycnoporus cinnabarinus, Merulius tremellosus*, members of the *Pleurotus* fungal genus, such as *Pleurotus ostreatus, Ceriporiopsis sub-vermispora, Trametes versicolor* and *Trichoderma harzianum*. Further, other bacteria species, when in company, accelerate decomposition and other activities.

Fungi and bacteria with various functions may be included in the composition to maximize the positive influence for the most immediate and long term effect and provide opportunity for customization where desired. For example, Mycorrhizae fungi and other chitin degrading fungi such as *Trichoderma harzianum* have been reported to serve as organic soil amendment (for example, U.S. Pat. No. 8,790,436). Naturally occurring nitrogen fixing fungi, such as *Aspergillus flavus-oryzae* (for example U.S. Pat. No. 4,670,037) have been utilized in biological fertilizers. Naturally occurring microorganisms capable of solubilizing phosphate rock ore or other insoluble phosphates into soluble phosphates have also been utilized in biological fertilizers either separately (see for example U.S. Pat. No. 5,912,398) or in combination with nitrogen fixing microorganisms (for example U.S. Pat. No. 5,484,464).

Genetically modified bacteria strains have also been developed and utilized in biological fertilizers. An approach based on recombinant DNA techniques has been developed to create more effective nitrogen fixing, phosphorus decomposing, and potassium decomposing bacterial strains for use in a biological fertilizer (see for example, U.S. Pat. No. 5,578,486; WO 95/09814). Other bacteria suitable for the present composition are disclosed in U.S. Pat. Nos. 5,342,765, 8,785,160, and 8,790,436, the entirety of which are hereby incorporated by reference. Yeast cell components are also optional components to be included in the composition (See for example, U.S. Pat. No. 6,828,132).

The amount and ratio of the fungal species in the composition is dictated by factors including the soil precondition and the specific purpose of the treatment and can be determined by one of ordinary skill in the art without undue experimentation. The present invention also includes masterbatch compositions of fungal spawn, or other lignin-digesting species or enzymes, to be added to lignin-containing fertilizer compositions by the end-user, or as part of the fertilizer manufacturing process. In one embodiment, fertilizer compositions according to the present invention contain up to about 25 wt % of fungal spawn in admixture of lignocellulosic organic materials and nutrient additives. In one embodiment, fertilizer compositions according to the present invention contain 1-2% fungal spawn to 99-98% substrate containing lignocellulosic materials and nutrient additives, all of which are mixed together by fertilizer blender. Spawn-containing fertilizer compositions according to the present invention are desiccated to provide a product having a water content of less than about 5 wt %, to provide a composition in which the spawn are in a non-vegetative state.

According to one masterbatch embodiment, spawn is sold in concentrate for later application by fertilizer manufacturing. The product is comprised of fully integrated spawn grown on a favorable lignocellulosic substrate and then desiccated to provide a product that is almost entirely spawn in a non-vegetative state having a water content of less than about 5 wt %. In some embodiments the water content is less than about 2.5 wt % and in other embodiments the water content is less than about 1.0 wt %. Typical masterbatch embodiments contain greater than 90 wt % spawn and preferably greater than 95 wt % spawn, The lignin-containing organic matter may be any material that normally undergoes slow breakdown and thus makes it unavailable to provide a desirable amount of nutrition for plant uptake. Non-limiting examples of such lignin-containing material includes spent coffee grounds (SCG), paper, cardboard, food residuals, leaf matter, hay, straw, deciduous wood waste, residues from lumbering and manufacturing for direct use as beneficial mulch, plant growth media, and soil conditioner, which in the formulations of the present invention can be used without undergoing separate composting steps designed to release otherwise unavailable nutrients inherent in the material.

In some embodiments, the lignin-containing material is SCG. Because of the granular particle shape, size and availability as a discarded waste product, spent coffee grounds provide an excellent example of transformational benefit in this patent document. Commercially, coffee is brewed in restaurants, hospitality industries, institutional food facilities, and otherwise transformed through the manufacture of specialty coffee products and flavorings worldwide. According to the USDA, the worldwide consumption of coffee expected during years 2013/14 is 9.7 million short tons.

To date, there has been no organized effort to recapture spent coffee grounds from commercial generators. In part, viable markets have not evolved to substantially capture commercial benefit from the aggregation of the waste stream, and so it remains a discarded waste in landfills. Roasted and ground coffee residues from commercially brewed coffee, and residues from roasted coffee processed to produce other coffee products contain different chemical properties from green (unroasted) coffee and its field residues. Because of bean roasting and hot water extraction that precedes its use as a brewed coffee beverage, manufactured to provide instant and/or decaffeinated beverage product, or dry or extract flavoring agent, much of the inherent oils and chemicals potentially harmful to plant growth have been removed. Spent coffee grounds are recovered from commercial coffee beverage generating facilities, restaurants, hospitality industries, and commercial coffee product manufacturing facilities.

In some exemplary embodiments, the collected coffee grounds are inoculated with fungal spawn, including fungi such as white rot fungal populations in vegetative cultures or spawn, with or without additional bacteria. After a desirable interval, the optimized spent coffee grounds or ligneous material are further reformed into specifically suited nutrient formulations for utilization as a compost accelerator, fertilizers, enhanced mulch, soil characteristic conditioners, overwintering media for frost tender species, and other related products. The spawn master-batches of the present invention can be used as compost accelerators and mulch enhancers. Greater amounts of organic matter are required for fertilizer compositions, soil characteristic conditioners and overwintering media.

In some embodiments, after inoculation, native nitrogen (N), phosphorus (P), potassium (K) and trace mineral resources contained in SCG need no further curing, composting, or reforming to add immediate value. Additions of N, P, K and other natural resources to optimized spent coffee grounds are provided in some embodiments to complement and enhance its innate nutrient value for the benefit of varying growth condition requirements, enhancing immediate nutrient uptake requirements, and allowing the spent coffee grounds and microorganisms to provide long term benefits to soil.

The average base N, P, K value of SCG is 2.25–0.6–0.6. Concentrations of N, P, and K can vary slightly. The pH range is 6-8. Pretreated, approximately a quarter to one third of the nitrogen value of spent coffee grounds is readily available for immediate uptake in plant growth systems, and all of the nutrients are readily available to the micro- and macro-organisms contained in a compost system.

Techniques for inoculating a raw material with microorganisms are generally known in the art and can be practiced without undue experiments (See, for example, U.S. Pat. No. 6,488,732). The onset for the degradation of lignin-containing organic matter varies depending on the factors including for example, specific components and their ratio in the composition, the water content in the composition, and the condition of the soil to be treated. In some embodiments, once the composition is moistened, the fungal species therein immediately begin to degrade the lignin. In some embodiments, substantial degradation takes place only under conditions within a particular range of temperatures, and pH value of the composition.

The range of optimum pH for propagation of important microorganisms for lignin degradation, such as lignin-degrading microorganisms is 6-9. For some fungal species, the most optimum pH is 6-8. For other fungal species, the most optimum pH is 7-8. The pH of raw materials can be too low due to production of organic acids during the degradation process and the pH can be too high due to presence of excess ammonia, and both cause delay in degradation. This problem can be resolved by prior pH adjustment with the addition of a pH modifier or pH-adjusting agent in order that pH value during fermentation will be within a range of pH 6-9.

The quantity and type of pH modifier to add can be readily determined by one of ordinary skill in the art without undue experimentation. Examples of pH modifiers include, for example, phosphates, such as sodium phosphate; phosphates monobasic, such as sodium di-hydrogen phosphate and potassium di-hydrogen phosphate; phosphates dibasic, such as disodium hydrogen phosphate and di-potassium hydrogen phosphate; citrates, such as sodium citrate (anhydrous or dehydrate); bicarbonates, such as sodium bicarbonate and potassium bicarbonate may be used. In some embodiments, a single buffering agent, e.g., a dibasic buffering agent is used. In some embodiments, a combination of buffering agents is employed, e.g., a combination of a tri-basic buffering agent and a monobasic buffering agent.

The effectiveness of the compositions of the present invention can be improved by the use of a pH modifier that serves as a nutrition source as well. For example, pH modifying ammonia or calcium-containing compounds can also be used as a nutrition source too, such as calcium silicate, lime nitrogen, quick lime, slaked lime, calcium carbonate, magnesia lime and the like. Magnesia quick lime can be used when the pH is too low, and a phosphorus fertilizer such as liquid phosphoric acid, super phosphate of lime and triple super phosphate of lime can be used when the pH is too high. The pH modifier can be added simultaneously with or after adjusting moisture content.

Sources of N, P, K and other nutrients may be added to fertilizer and masterbatch compo-sitions of the present invention to enhance the innate nutrient value for the benefit of varying growth condition requirements, enhancing immediate nutrient uptake requirements, immediate nutrient requirements of microorganisms, and allowing the composition of the lignocellulosic material and the fungal species contained therein to provide long term benefits to soil.

The composition provides additional benefits besides serving as a nutrition source. The resulting degradation products of the lignin-containing material, for example hydrophilic sugars, attract water and therefore modify the water holding capacity of the adjacent soil environment. In non-limiting exemplary embodiments, the water holding capacity of the soil as a result of applying the composition is increased by more than about 10%, about 20%, or about 30%. Further, the degradation products contain minimum amount of phenols including their derivatives such as phenolic acids which are considered a detriment to plant and crop success, and are degraded by the enzyme action of the fungal species employed. Further, the fungal species of the composition has attributes of bio-degrading hazardous substances in the soil, such as pesticides and other non-beneficial chemicals, and thus leading to the reduction or elimination of pesticides required to reduce the damage of those organisms in cash crops. Under some circumstances, fruiting bodies of some fungal species could constitute a secondary protein crop.

The composition can be provided in various forms. Non-limiting examples include a powder, granules, a suspension, dispersion, fibrous matter, a mixture, and combinations thereof.

Method of Treating Soil

In another embodiment there is provided a method for treating soil using the above described composition. Methods according to the present invention typically apply to the soil between about 0.025 and about 0.60 tons per acre of the inventive compositions. In one embodiment, between about 0.05 and about 0.50 tons per acre of the inventive compositions are applied to the soil. In another embodiment, between about 0.10 and about 0.40 tons per acre of the inventive compositions are applied to the soil. In yet another embodiment, between about 0.20 and about 0.30 tons per acre of the inventive compositions are applied to the soil.

Treating soil includes providing enhanced nutrition availability and mediating soil condition. Non-limiting examples include enhancing or enriching the nutrition content of the soil, changing or improving water holding or moisture retention capacity of the soil, providing weed preventive mulch barriers, reconditioning the soil (e.g. changing pH of the soil), reducing nematode populations, providing a compost accelerator, serving as overwintering media for frost tender species, and bio-degrading hazardous substances in the soil (e.g. pesticides and other non-beneficial chemicals).

Besides providing nutrition sources as described above, the present compositions can be used for other purposes such as bioremediation when being exposed to chemical residue contaminants. As the deleterious compounds are disabled by fungal enzymatic lysis, natural soil organisms return to the local environment, enhancing both the biodiversity of the soil, and conse-quently increasing its ability to regain nitrogen fixation activity, aeration, and moisture balance lost during the contamination. Often soils depleted of biodiversity from chemical contamination also exhibit hydrophobicity due to the depletion of organic matter and diverse activity.

Fungal activity of the present invention brought to the soil with optimized coffee grounds, wood waste, or other lignocellulose materials serves the dual purpose of slowly restoring the hydrophilic characteristics to the local environment, while improving the nutrient balance of the soil. In addition, some white rot fungi are reported to scavenge for nematodes, diversifying its food source beyond ligneous material. This trait could serve to reduce the need for pesticides in soils where such optimized products are employed. Particle size management of lignocellulosic substrates is important. For example, the small granular native particle size of coffee grounds makes for an easy distribution in and on soil systems, reaching an even, continued distribution employing conventional spreading equipment. The small particle size also allows for the reforming of the particle size by pelleting and other means to provide a variety of particle sizes suitable for various land applications. Accordingly, the present method applies to various aspects of optimizing soil condition, physically, chemically, and functionally.

The means and amount of the composition to be applied to the soil depends on factors including the soil precondition and purposes of the treatment and specific formulations of the compositions and can be determined by one of ordinary skill in the art without undue experiments. In non-limiting embodiments for illustration of "applying the composition", the composition can be spread or sprayed as a surface dress, mixed with the soil, or combined with other substances before being put in contact to the soil.

What is claimed is:

1. A method of treating soil consisting of mixing a composition consisting essentially of spawn that is fully integrated on a lignocellulosic substrate with the soil in an amount effective to degrade the lignin content of said lignocellulosic substrate, and thereby enrich the nutrient content of said soil, wherein said spawn is of a lignin-digesting fungal species, and both of said spawn and said lignocellulosic substrate are desiccated so that said spawn is in a non-vegetative state and said composition has a water content less than about 5 wt % and said composition is mixed directly with said soil in an amount between about 0.025 and about 0.60 tons per acre.

2. The method of claim 1, wherein between about 0.05 and about 0.50 tons of said composition is applied per acre of soil.

3. The method of claim 1, wherein said lignin-digesting fungal species produces a lignin peroxidase.

4. The method of claim 1, wherein said lignin-digesting fungal species comprises a white rot fungal species.

5. The method of claim 1, wherein said composition further comprises a second species of fungal spawn that produces a soil nutrient, or a species of bacteria that produces a soil nutrient.

6. The method of claim 5, wherein the second fugal species is selected from the group consisting of *Coriolus versicolor, Phanerochaete chrysosporium, Daedalea quercina*, Pycnoporus, *cinnabarinus, Merulius tremellosus*, members of the *Pleurotus* fungal genus, *Ceriporiopsis subvermispora, Trichoderma harzianum, Aspergillus oryzae, Trametes versicolor* and combinations thereof.

7. The method of claim 1, wherein the lignocellulose-containing organic matter comprises one or more lignocellulosic materials selected from the group consisting of spent coffee grounds, paper, cardboard, food residuals, leaf matter, hay, straw and deciduous wood waste and residues from lumbering and manufacturing.

8. The method of claim 1, wherein said composition comprises up to about 25 wt % of said spawn of lignin-digesting fungal species.

9. The method of claim 1, wherein said composition is in a form selected from the group consisting of a powder, granules, a suspension, a dispersion, fibrous matter, a mixture, and combinations thereof.

10. The method of claim 1, wherein said composition further includes at least one nutrient additive consisting of at least one of N, P, K or other nutrient compounds.

11. The method of claim 1, wherein said composition further includes at least one pH-modifying compound.

* * * * *